United States Patent Office 3,703,479
Patented Nov. 21, 1972

3,703,479
SATURATED INDANE DERIVATIVES AND
PROCESSES FOR PRODUCING SAME
Ernst T. Theimer, Rumson, N.J., assignor to International
Flavors & Fragrances Inc., New York, N.Y.
No Drawing. Original application Aug. 18, 1969, Ser. No.
851,048. Divided and this application Sept. 28, 1971,
Ser. No. 184,641
Int. Cl. A61k 27/00
U.S. Cl. 252—522
3 Claims

ABSTRACT OF THE DISCLOSURE

A perfume composition containing as an essential fragrance ingredient a saturated indane compound of the formula

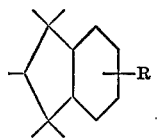

wherein R is carbonyl oxygen.

This application is a division of U.S. application Ser. No. 851,048 filed on Aug. 18, 1969.

BACKGROUND OF THE INVENTION

There is a continuing need for fragrance materials having desirable woody amber odors with satisfactory olfactory overtones or qualities. Many natural products have such woody amber fragrances, but the more desirable of these are frequently in short supply, and hence difficult to obtain and expensive. Further, while both natural and some synthetic materials can provide woody amber fragrance qualities, many of these are fleeting and unsuitable for use in quality perfumes or other olfactory compositions. Moreover, it is desirable to have such fragrance materials with musk, fruit-like, or similar overtones which can be blended with other materials.

THE INVENTION

Briefly, the present invention provides novel saturated indane derivatives having the formula

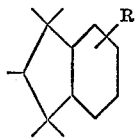

wherein R is a carbonyl oxygen or a hydroxy, acyloxy, or alkyloxy group. These substances have a persistent strong woody amber fragrance with fruit-like and musk aroma notes. Thus, the present invention also provides novel perfume and fragrance compositions containing such indane derivatives, and processes for producing such derivatives are also disclosed herein.

More specifically, the indanones contemplated herein are 1,1,2,3,3-pentamethylhexahydro-4(5H)-indanone having the formula

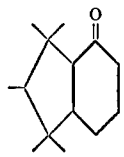

and 1,1,2,3,3-pentamethylhexahydro-5(4H)-indanone having the formula

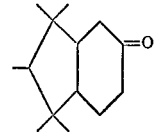

The indanols and derivatives contemplated according to this disclosure include 1,1,2,3,3 - pentamethylhexahydroindan-4-ol having the formula

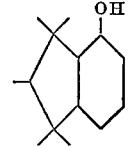

1,1,2,3,3-pentamethylhexahydroindan - 5 - ol having the formula

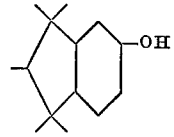

the corresponding indanyl alkyl ethers according to the formulas

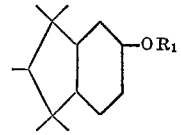

and

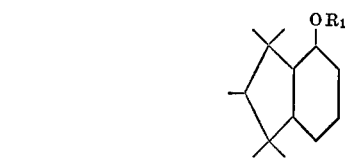

and the corresponding indanyl esters according to the formulas

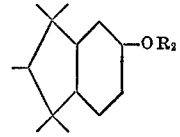

and

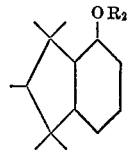

In the foregoing formulas $R_1$ is a lower alkyl group, desirably one having from one to five carbon atoms, with methyl being a preferred lower alkyl group; and $R_2$ is a lower alkyl acyl group having from one to five carbon atoms, with the acetyl group being preferred. It will be appreciated from the present disclosure that the foregoing materials can exist in several stereoisomeric forms, and it is contemplated that the formulas given above include the several isomeric forms.

The alcohols can be prepared directly from the corresponding pentamethylindane by sulfonation, alkali fusion, and hydrolysis to provide pentamethylindanol and then hydrogenation to the hexahydropentamethylindanol. Alternatively, the saturated 3a,7a-epoxypentamethylindane can be treated with an aluminum trialkoxide to form the monounsaturated alcohol.

The alcohols can also be produced directly from pentamethylindane by treatment with an acyl halide such as acetyl chloride or the like in the presence of a Friedel-Craft catalyst followed by oxidation of the indanealkyl ketone with a peroxygen material such as peracetic acid and the like to provide the indanyl ester. Hydrolysis of the ester provides the indanol which is then hydrogenated as set forth below to afford the saturated indanol. A tetrahydroindanol can also be obtained by Birch reduction of 5-indanol as shown in J. Am. Chem. Soc. 89, 1044. The tetrahydroindanols so prepared are then hydrogenated and oxidized to the ketone, as taught herinafter.

The ketones of this invention can be produced by a number of routes. One preferred route is the oxidation of a saturated or unsaturated 4-indanol or 5-indanol under conditions providing the corresponding ketone. According to this preferred route, any reagent which will convert a secondary hydroxyl to a carbonyl oxygen can be used. Exemplary of such oxidizing agents are Jones reagent (a chromium trioxide-sulfuric acid mixture) and oxygen-metal systems.

The oxidation of the hydroxyl group is carried out on a hydrogenated indanol. In the event that the ketone is not saturated the six-membered ring is subsequently hydrogenated with a catalyst under conditions which will not reduce the carbonyl group. Suitable catalysts for this reaction include metallic catalysts such as Raney nickel, or noble metals such as platinum, palladium, and the like utilized at substantially superatmospheric pressures on the order of 50 to 125 atmospheres. It is preferred to carry out the hydrogenation at from 1000 to about 1500 p.s.i.g. at 150° to 250° C.

The oxidation is carried out by treating the secondary alcohol with hexavalent chromium or oxygen-metallic catalyst oxidizing systems. It is desirable in carrying out such a reaction that the alcohol be dissolved or dispersed in a reaction vehicle which serves to moderate the reaction and provide better control. Suitable vehicles include oxygenated solvents such as acetone or lower carboxylic acids such as acetic acid. It will be understood that mutual solubility of the indanyl alcohol and oxidizing agent in the reaction vehicle is preferred.

The Jones reagents is prepared by dissolving chromium trioxide or alkali metal dichromate in aqueous sulfuric acid, e.g., 30% to 50% $H_2SO_4$, preferably 40% $H_2SO_4$. At least an equimolar quantity of the oxidizing agent is mixed with the indanol in the reaction vehicle for best results. It is preferred to use an excess of oxidizing agent up to about 50 molar percent based upon the weight of the indanol, and a molar excess of 25 to 40% is preferred. The oxidation is carried out at mild temperatures on the order of 10–30° C. In a preferred embodiment of the invention, the reaction is carried out at 15–20° C.

The oxidation to provide the ketones can also be carried out with the oxygen-metallic catalyst system disclosed above. In this case the oxygen can either be pure or in admixture with an inert diluent such as nitrogen or the like. The catalyst is preferably a metal such as silver. Copper can also be used.

After the reaction to produce the ketone is completed, the product can be separated from the vehicle and any unreacted materials or unwanted by-products removed by conventional means including washing, distillation, crystallization, extraction, preparative chromatography,, and the like. It is preferred to fractionally distill the washed reaction product under relatively high vacuum so as to obtain a pure product. Product purities of 80% are readily obtained, and much higher purities can also be provided by suitable treatment. All parts, proportions, percentages and ratios herein are by weight unless otherwise indicated.

The pentamethylhexahydroindanones of this invention are useful as fragrances. They can be used singly or in combination to contribute a woody amber fragrance. As olfactory agents the indanones of this invention can be formulated into or used as components of a "perfume composition." The term "perfume composition" is used herein to mean a mixture of organic compounds, including, for example, alcohols, aldehydes, ketones, esters and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials.

In perfume compositions the individual component will contribute its particular olfactory characteristics, but the overall effect of the perfume composition will be the sum of the effect of each ingredient. Thus, the individual compounds of this invention, or mixtures thereof can be used to alter the aroma characteristics of a perfume composition, for example, by highlighting or moderating the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 2% by weight of mixtures or compounds of this invention, or even less, may be used to impart a woody amber odor to soaps, cosmetics, and other products. The amount employed can range up to 7% or higher and will depend on considerations of cost, nature of the end product, the effect desired on the finished product and the particular fragrance sought.

The indanones of this invention can be used alone or in a perfume composition as olfactory components in detergents and soaps; space deodorants; perfumes; colognes; bath preparations such as bath oil and bath salts; hair preparations such as lacquers, brilliantines, pomades and shampoos; cosmetic preparations such as creams, deodorants, hand lotions and sun screens; powders such as talcs, dusting powders, face powder, and the like. When used as an olfactory component of a perfumed article, as little as 0.01% of the novel ketones will suffice to impart a woody amber odor.

In addition, the perfume composition can contain a vehicle or carrier for the other ingredients. The vehicle can be a liquid such as alcohol, glycol, or the like. The carrier can be an absorbent solid such as a gum or components for encapsulating the composition.

It will also be appreciated that the pentamethylhexahydroindanones according to this invention can be used to enhance, modify, or supplement the fragrance properties of natural or synthetic fragrance compositions. Thus, the indanones can be used in fragrance compositions for addition to perfume compositions or directly to products such as soap, detergents, cosmetics, and the like. The fragrance compositions so prepared do not entirely provide the olfactory properties to the finished perfume or other article, but they do furnish a substantial part of the overall fragrance impression.

The following examples are given to illustrate embodiments of the invention as it is presently preferred to practice it. It will be understood that these examples are illustrative, and the invention is not to be considered as restricted thereto except as indicated in the appended claims.

EXAMPLE I (a) Preparation of pentamethylindanesulfonic acid

A five-liter flask equipped with a stirrer, condenser, and dropping funnel is charged with 1500 g. of concentrated sulfuric acid, and 400 g. of 1,1,2,3,3-pentamethylindane is added dropwise while the temperature is maintained at 30–35° C. After addition is completed stirring is continued for an additional hour.

A five-liter flask is set up with a thermometer and stirrer and immersed in a dry ice-isopropanol bath, and one liter of water is charged to the flask. After the water is cooled to 10° C. the foregoing reaction mixture is added dropwise to the water while the 10° temperature is maintained. The addition of reaction mixture to the water is completed and the stirring is continued for 30 minutes before filtering the flask contents through a Buchner funnel under vacuum. The solids so obtained are pressed to remove water.

The solids are rinsed in 100 ml. of 1% hydrochloric acid at 0° C. and pressed to obtain 822.2 g. of crude crystals. After overnight drying in a vacuum desiccator, the 773.9 g. of crude solids are placed in three liters of benzene and refluxed to remove further water. The benzene mixture is cooled to 40° C. and filtered, and the benzene is distilled off under 50 mm. Hg to recover 1,1,2,3,3-pentamethylindanesulfonic acid.

(b) Preparation of pentamethylindanol

One mole of the indanesulfonic acid so produced is thoroughly admixed with two moles of sodium hydroxide, and the mixture is heated to the fusion temperature of 360° C. and maintained at that temperature for two hours. During the fusion the reaction mass is mechanically agitated.

After the heating is completed, the reaction mass is cooled and extracted with water. The product is then neutralized with dilute hydrochloric acid, and the indanol so produced is extracted with benzene. The benzene is stripped to provide 1,1,2,3,3-pentamethylindanol.

(c) Production of pentamethylhexahydroindanol

Into a 200 ml. stainless steel autoclave are introduced 70 g. of 1,1,2,3,3-pentamethylindan-5-ol, 5 g. of 5% rhodium on carbon catalyst, and 150 ml. of isopropyl alcohol. While maintaining the temperature within the autoclave at 20° C., hydrogen gas is fed in until a pressure of 1025 p.s.i. is reached. While the hydrogen pressure is maintained at about 1025 p.s.i., the temperature of the reaction mass is raised over a period of three hours to 178° C. (at which point the pressure rises to 1500 p.s.i.).

After eighteen hours of hydrogenation at 1500 p.s.i. and 178° C., the crude reaction mass is stripped free of solvent. Infrared and NMR analysis indicate that the reaction mass contains 1,1,2,3,3-pentamethylindan-5-ol having the structure

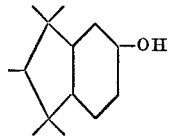

Similar reactions are run with a Raney nickel catalyst at 1500 p.s.i.g. and 200° C. and with a palladium on carbon catalyst at 150 p.s.i.g. and 200° C. to provide substantially identical results.

A substantially identical reaction is carried out with 1,1,2,3,3-pentamethylindan-4-ol to produce 1,1,2,3,3-hexahydroindan-4-ol having the formula

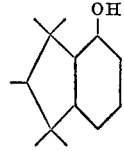

A 500 ml reaction flask is charged with 50 g. of crude hexahydropentamethylindan-5-ol obtained by hydrogenating the indan-5-ol produced in Example I. Jones reagent is produced by dissolving chromium trioxide in 20% aqueous sulfuric acid. The flask contents are maintained at 15–20° C. while 75 ml. (0.33 mole) of the Jones reagent is added. The reaction flask contents are then stirred for one-half hour beyond the thirty minutes required for addition of the Jones reagent.

The ketone is recovered by adding 25 cc. of methanol and 50 cc. of toluene. The organic layer is separated, and the remaining aqueous layer is extracted with toluene. The toluene extract is added to the original extract, and the organic material is washed to neutrality with water and then stripped and distilled.

The 33 g. of distilled material is admixed with 2 g. of Primol mineral oil and antioxidant and distilled at a vapor temperature of 96–120° C. at 1–2 mm. Hg to obtain 23.5 g. of the pentamethylhexahydro-5-indanone.

The purified material is a clear liquid boiling at 96–99° C. at 2.0 mm. Hg. The IR spectrum shows significant peaks as follows: at 5.8 microns, at 7.1 microns, and at 7.2 and 7.3 microns. These peaks are attributable to a cyclohexanyl ketone, a methylene adjacent to a carbonyl, and to gem-dimethyl and methyl respectively. Raman spectrometry does not show the presence of any carbon-to-carbon unsaturation.

The ketone so obtained has an unmistakeable woody amber odor with a musk quality. This material is compared with a ketone called "Ketone BD-9," a 3,5,5,7,7-pentamethyldecahydro-2-naphthalenone, and it is found that the indanone is a product having a much better woody amber character, whereas said naphthalenone has a simple woody aroma. The fragrance characteristics are considered to be quite different.

The process set forth in Example II can be carried out with the corresponding pentamethylhexahydroindan-4-ol to obtain a fragrance product similar to that obtained in Example II.

EXAMPLE III

Preparation of 1,1,2,3,3-pentamethylhexahydroindan-4-ol

The following ingredients are charged into a stainless steel five-liter autoclave equipped with a hydrogen gas feed:

1,800 g. (8.14 moles) of 1,1,2,3,3-pentamethylindane (85% pure)
90 g. of Raney nickel Enough hydrogen is fed into the autoclave to raise the pressure to 1000 p.s.i.g. The hydrogen feed is then continued at 3 ml./min., and the autoclave is heated up to a temperature in the range of 150–185° C. over a period of 8 hours. During this time the pressure in the autoclave is maintained at 1500 p.s.i.g.

The 1641 g. of crude product removed from the autoclave is distilled on a 12-inch Goodloe column after being mixed with 10.0 g. of Primol mineral oil. The distillate is recovered in two fractions:

Fraction I: Distills at a temperature of 78–82° C. and 4.0 mm. Hg to provide 401 g. of 4,5,6,7-tetrahydro-1,1,2,3,3-pentamethylindane.

Fraction II: Distills at a temperature of 86–88° C. and 3.5–3.8 mm. Hg to provide 729 g. of hexahydro-1,1,2,3,3-pentamethylindane.

A sample of Fraction I is further refined on a six-foot by ¾ inch gas liquid chromatographic (GLC) column containing 20% Carbowax polyethylene glycol and operated at 110° C. Analysis by infrared (IR) and proton magnetic resonance (PMR) confirms the structure:

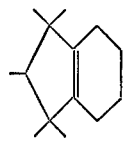

Into a 250 ml. flask equipped with thermometer, stirrer, reflux condenser and ice bath are introduced 195 g. of the tetrahydroindane produced above and 15 g. of sodium acetate. At 25° C. to 30° C. 124 g. of 40% peracetic acid (0.65 mole) is added during four hours. After addition is completed an equal volume of water is added to the reaction mass. The aqueous phase is separated from the organic phase and extracted with 150 ml. of toluene. The toluene extract is combined with the organic phase and washed with one volume of 5% aqueous sodium hydroxide solution and then with one volume of water.

The solvent is stripped off leaving a crude product weighing 208 g. The crude epoxy product is distilled on a 12-inch Goodloe column after addition of 4.0 g. of triethanolamine at 72–74° C. and 1.0–1.4 mm. Hg.

Into a 500 ml. flask equipped with reflux condenser, stirrer, thermometer and addition funnel are introduced 250 cc. toluene and 80 g. aluminum trisopropoxide. The mixture is heated to reflux and 90 g. of the epoxyhexahydroindane as produced above is added drop-wise over 1¼ hours at reflux. The reaction mass is further refluxed for 10 hours whereupon it is cooled to 25° C.

The cooled reaction mass is poured into a mixture of 500 g. ice and 200 cc. of 15% sulfuric acid, stirred for 15 minutes, and separated into an aqueous phase and an organic phase. The aqueous phase is extracted with 200 cc. toluene, and the toluene extract is combined with the organic layer. The bulked material is washed with saturated aqueous sodium bicarbonate and twice with 100 cc. of water. The solvent is stripped from the washed organic phase to provide a crude product weighing 71 g.

The crude product is distilled on a 4-inch micro-Vigreux column at a vapor temperature of 105°–107° C. and 2.1–2.3 mm. Hg to obtain 4,5,6,7-tetrahydro-1,1,2,3,3-pentamethyl-4-indanol.

Into a 200 ml. stainless steel autoclave are introduced 60 g. of the tetrahydropentamethyl-4-indanol so produced, 5 g. of 5% rhodium on carbon catalyst, and 150 ml. of isopropanol. The temperature of the autoclave is maintained at 20° C. while hydrogen gas is fed in to obtain a pressure of 1025 p.s.i.g. The temperature is then raised to 180° C. whereupon the temperature rises to 1500 p.s.i.g.

After 18 hours of hydrogenation under these conditions, the hydrogen is vented and the autoclave is cooled to room temperature. The solvent is stripped off to yield a crude product weighing 35 g. The product is washed and distilled to obtain 1,1,2,3,3-pentamethylhexahydroindan-4-ol.

EXAMPLE IV

Preparation of 1,1,2,3,3-pentamethylhexahydro-4(5H)-indanone

Into a 500 ml. flask fitted with cooling means, stirrer, thermometer and reflux condenser are introduced 50 g. of the hexahydroindan-4-ol produced in Example III and 300 ml. of acetone. The mixture is stirred while 75 ml. of Jones reagent is added. The reaction mixture is then stirred for one hour, after which 25 ml. of ethanol and 50 ml. of toluene are added. The aqueous phase is removed and the organic phase is washed and neutralized with sodium bicarbonate.

The solvent is stripped off and the remaining organic material is distilled to provide 1,1,2,3,3-pentamethylhexahydro-4(5H)-indanone having a woody amber odor with a fruit-like musk quality.

EXAMPLE V

Preparation of soap compositions

A total of 100 g. of soap chips is mixed with one g. of the perfume composition given below until a substantially homogeneous composition is obtained. The soap composition manifests a characteristic woody amber, musk-like odor.

The perfume composition consists of the following ingredients.

| Ingredient: | Parts |
| --- | --- |
| Vetivert oil | 40 |
| Ketone produced in Example II | 60 |
| Sandalwood oil | 100 |
| Rose geranium oil | 200 |
| Musk extract (3%) | 25 |
| Civet extract (3%) | 25 |
| Benzyl-iso-eugenol | 100 |
| Coumarin | 100 |
| Heliotropin | 50 |
| Bois de Rose oil | 200 |
| Benzoin resin | 100 |
| | 1,000 |

Similar results are obtained when the ketone of Example IV is used to replace the ketone of Example II.

EXAMPLE VI

Preparation of a detergent composition

A total of 100 g. of a detergent powder is mixed with 0.15 g. of the perfume composition set forth in Example V until a substantially homogeneous composition having a woody amber or amber-musk like odor is obtained.

EXAMPLE VII

Preparation of a cosmetic powder composition

A cosmetic powder is prepared by mixing 100 g. of talcum powder with 0.25 g. of the ketone obtained from the process of Example II in a ball mill. A second cosmetic powder is similarly prepared except that the ketone prepared by Example II is replaced by the compound prepared by Example IV. All have woody amber, musk-like odors.

EXAMPLE VIII

Liquid detergent containing 1,1,2,3,3-pentamethylhexahydroindanones

Concentrated liquid detergents with a woody amber, musk-like odor are prepared containing 0.1%, 0.15% and 0.20% of the ketone produced in Example IV. They are prepared by adding and homogeneously mixing the appropriate quantity of the compound to P-87 liquid detergent produced by Ultra Chemical Co.

What is claimed is:

1. A perfume composition containing as an essential fragrance ingredient a saturated indane compound of the formula

wherein R is a carbonyl oxygen, and an auxiliary perfume adjuvant.

2. A perfume composition as defined in claim 1 wherein said saturated indane compound is 1,1,2,3,3-pentamethylhexahydro-4(5H)-indanone.

3. A perfume composition as defined in claim 1 wherein said saturated indane compound is 1,1,2,3,3-pentamethylhexahydro-5(4H)-indanone.

References Cited

Noller, "Chemistry of Organic Compounds," 3rd edition, pp. 150–152 (1965).

Appel et al.: "J. Chem. Soc.," vol. 1959, pp. 3322–32 (1959).

Norm, "Chem. Abstracts," vol. 57, pp. 7317–9 (1962).

Dutta et al.: "Chem. Abstracts," vol. 59, p. 468c (1963).

STANLEY J. FRIEDMAN, Primary Examiner

U.S. Cl. X.R.

252—89, 108; 260—488 B, 586 R, 586 B, 611 F, 617 F, 617 H; 424—59, 63, 65, 69, 70, 76 Dig. 1, Dig. 2